United States Patent
Diosi et al.

(10) Patent No.: US 7,699,736 B2
(45) Date of Patent: Apr. 20, 2010

(54) MULTI-SPEED TRANSMISSION

(75) Inventors: Gabor Diosi, Friedrichshafen (DE); Josef Haupt, Tettnang (DE); Peter Ziemer, Tettnang (DE); Pedro Casals, Tettnang-Kau (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 360 days.

(21) Appl. No.: 11/774,071

(22) Filed: Jul. 6, 2007

(65) Prior Publication Data
US 2008/0009384 A1    Jan. 10, 2008

(30) Foreign Application Priority Data
Jul. 6, 2006    (DE)    ........................ 10 2006 031 278

(51) Int. Cl.
F16H 3/72    (2006.01)
F16H 37/06    (2006.01)
F16H 3/62    (2006.01)
F16H 3/44    (2006.01)

(52) U.S. Cl. ........................... 475/5; 475/277; 475/282; 475/288; 475/311; 475/317; 475/330; 903/911

(58) Field of Classification Search ................ 475/5, 475/10, 275–280, 282, 284, 286, 288, 290, 475/296, 303, 311, 313, 317, 319, 323, 325, 475/330; 74/661; 903/911
See application file for complete search history.

(56) References Cited

U.S. PATENT DOCUMENTS

| 4,478,106 | A | * | 10/1984 | Schreiner ..................... 475/276 |
| 4,744,267 | A | * | 5/1988 | Lepelletier .................. 475/276 |
| 4,976,670 | A | * | 12/1990 | Klemen ....................... 475/278 |
| 5,342,258 | A | * | 8/1994 | Egyed ......................... 475/281 |
| 6,705,416 | B1 | | 3/2004 | Glonner et al. |
| 6,960,149 | B2 | | 11/2005 | Ziemer |
| 7,018,319 | B2 | | 3/2006 | Ziemer |
| 7,267,630 | B2 | * | 9/2007 | Tabata et al. ................ 475/275 |
| 7,497,802 | B2 | * | 3/2009 | Kamm et al. ............... 475/282 |
| 7,578,765 | B2 | * | 8/2009 | Tabata et al. ................... 477/5 |

FOREIGN PATENT DOCUMENTS

| DE | 199 17 665 A1 | 10/2000 |
| DE | 101 15 983 A1 | 10/2002 |
| DE | 101 15 995 A1 | 10/2002 |
| DE | 10 2005 002 337 A1 | 8/2006 |

* cited by examiner

*Primary Examiner*—Tisha D Lewis
(74) *Attorney, Agent, or Firm*—Davis & Bujold, P.L.L.C.

(57) ABSTRACT

A multi-speed automatic planetary transmission for a motor vehicle having an input shaft (AN), an output shaft (AB), four planetary gearsets (RS1, RS2, RS3, RS4), at least eight rotatable shafts (1, 2, 3, 4, 5, 6, 7, 8), and five shifting elements (A, B, C, D, E), the selective engagement of which produces different transmission ratios between the input shaft (AN) and the output shaft (AB), such that eight forward gears and at least one reverse gear are possible. Further, it is possible to connect an electric machine (12) as generator and/or drive, to the fifth shaft (5) by means a drive connection.

10 Claims, 2 Drawing Sheets

MULTI-SPEED TRANSMISSION

This application claims priority from German Application Serial No. 10 2006 031 278.3 filed Jul. 6, 2006.

FIELD OF THE INVENTION

The invention relates to a multi-speed, planetary transmission, in particular an automatic transmission for a motor vehicle.

SUMMARY OF THE INVENTION

The priority application discloses a multi-speed, planetary transmission comprising an input shaft, an output shaft, four planetary gearsets, at least eight rotatable shafts and five shifting elements—two brakes and two clutches, whose selective engagement produces different transmission ratios between the input shaft and the output shaft, so that eight forward gears and one reverse gear are realizable. All four planetary gearsets are preferably executed as negative planetary gearsets, whose respective planetary gears mesh with a sun gear and a ring gear of the respective planetary gearset. Different embodiments are proposed, where the sequence of the planetary gearsets is varied. The multi-speed transmission permits starting with a hydrodynamic converter or other suitable starting element. Finally, the multi-speed transmission is conceived in such a way that an electric machine can additionally be affixed as a generator and/or as an additional drive unit to each shaft.

Drive concepts of this type with different engines, for example a combustion engine and an electric machine, are known as hybrid drives. DE 199 17 665 A1 discloses a hybrid drive for a motor vehicle in which two electric machines, which can be connected via clutches, are arranged between the combustion motor and the transmission. This enables purely electrical operation when starting or at low vehicle velocities, as well as mixed operation with combustion motor and electric machine at higher vehicle velocities or at full vehicle power.

The present invention applies to an improvement and further development of the object of the Applicant's previous application DE 10 2005 00 2337.1 (main application). In particular, this improvement provides for the creation of a "hybrid-ready" form of execution of the multi-speed transmission, according to the older application, which enables the connection of an electrical machine.

SUMMARY OF THE INVENTION

The improvement comprises the possibility of connecting an electric machine to the fifth shaft of the multi-speed transmission by way of the (kinematic) drive connection. The inventive drive connection of the electric machine to the fifth shaft produces the following advantages: during a starter function of the electric machine, no additional shifting element—aside from the five existing shifting elements—is necessary. The ratio between the electric machine and the combustion motor is i=1. A further advantage is seen during generator function: the fifth shaft does not stop, in any of the eight forward gears. With the exception of the fourth gear, the speeds of rotation of the fifth shaft are the same or greater than the transmission input speed of rotation. An additional advantage is seen during electric startup of the motor vehicle, i.e., without the combustion motor: electric starting is possible with engaged brakes A, B without an additional shifting element, where the ratio, between the electric machine and the transmission output (output shaft), is the same as the ratio of the first gear (i=4.7). Finally, there is the advantage that recuperation operation (without the thrust of the combustion motor) is possible without an additional shifting element.

Another problem that is solved with the invention is that the fifth shaft, which was selected as advantageous, was not actually accessible from the outside, i.e., not connectable with the electric machine. In order to solve this problem, it is proposed that in this invention, the last gearset RS3 would be doubled or, as the case may be, split in two, where the "additional half" of the gearset would be assigned to the electric machine in the transmission. The invention provides for two parallel solutions, which both provide for the electric machine to drive additional planetary gears, via a sun gear.

According to the first solution, the sun gear engages planetary gears (without ring gear), which are connected, via a sleeve, to the planetary gears of the third gearset RS3. The shaft, which is configured as an output shaft, is divided in such a way that a shaft journal is rotatably positioned in the sleeve and the sleeve itself is accommodated in a pivot bearing of the carrier or, as the case may be, the output shaft. The sun gear is arranged in a ring gear through which the output shaft passes.

With the second parallel solution, the sun gear connected to the electric machine floats on an additional planetary gearset, which also engages the ring gear of the last planetary gearset RS3. The planetary gears of both planetary gearsets are identical in shape (having the same number of cogs) and are rotatably arranged on common planetary wheel bolts, which are connected to the carrier or the output shaft. The planetary gears of the gearset RS3 on the output side are, therefore, virtually doubled.

BRIEF DESCRIPTION OF THE DRAWINGS

The invention will now be described, by way of example, with reference to the accompanying drawings in which.

BRIEF DESCRIPTION OF THE DRAWINGS

Figure 1:
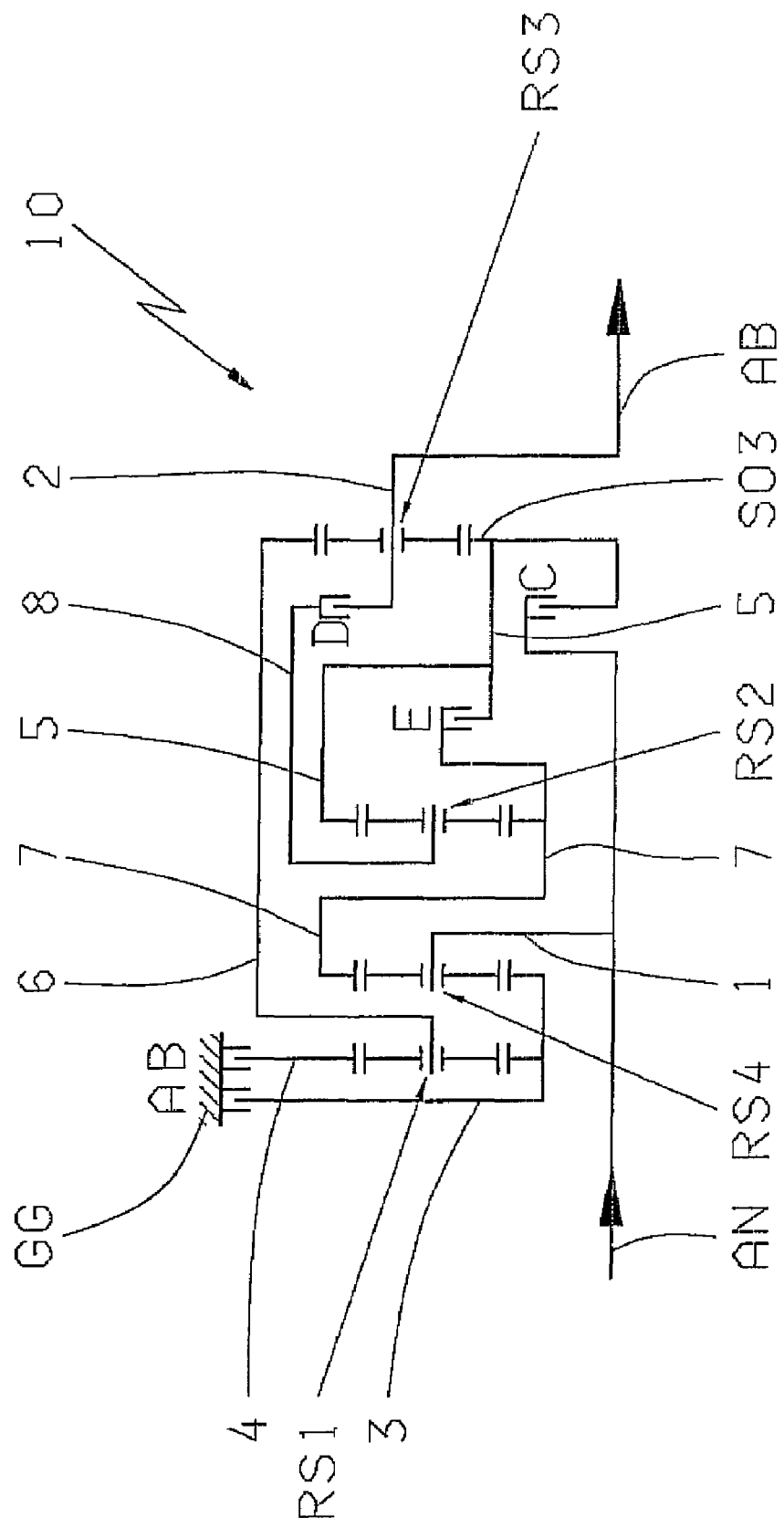
FIG. 1 is an embodiment of a multi-speed transmission according to the previous application (main application)

FIG. 1 shows an embodiment of a multi-speed transmission 10, according to FIG. 4 of the previous application (main application), whose content is hereby entirely incorporated by reference in the present application. In FIG. 1 of the present application, the same reference numbers are used as in FIG. 4 of the previous application, so that the description of the previous application also applies to the present FIG. 1. As mentioned at the beginning, this kind of multi-speed transmission is supposed to be made hybrid-ready, i.e., connected to an electric machine in a suitable way. In view of this task, the multi-speed transmission 10 will be briefly described once again: the transmission 10 features four gearsets in a sequence, from input to output of RS1, RS4, RS2, RS3. In addition, there is provision for a total of eight shafts, an input shaft AN or 1, an output shaft AB or 2, and the additional shafts 3 to 8, five shifting elements, two brakes A, B, as well as three clutches C, D, E. Therefore, output takes place via the third gearset RS3 and the output shaft 2, which is configured as a carrier shaft. In terms of the invention, the electric machine (not depicted) should be connected to the fifth shaft, i.e., connected by way of suitable drive connection element so that hybrid operation is possible with a combustion engine (not depicted) and which floats on the input shaft AN and with the electric machine (not depicted), which floats on the shaft 5. Corresponding solutions will be explained below.

Figure 2:
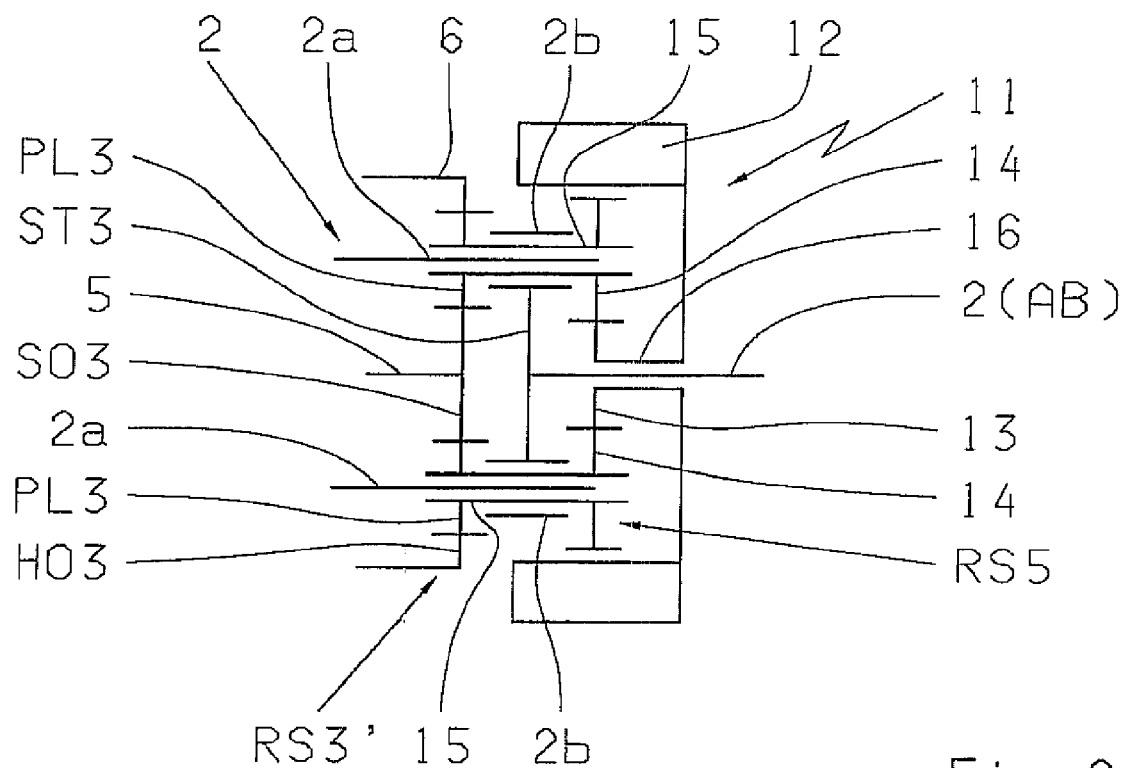
FIG. 2 is a first embodiment of the invention for connecting an electric machine via a drive connection.

FIG. 2 illustrates a first solution for an inventive hybrid-ready, multi-speed transmission 11, based on the transmission 10, according to FIG. 1. From the multi-speed transmission 10, according to FIG. 1, FIG. 2 depicts only the last (output-side) gearset RS3, designated as RS3', with its shafts 2, 5, 6. In addition, a sun gear SO3, a ring gear HO3, and a planetary gear PL3 all belong to the planetary gearset RS3'. An electric machine 12 is connected to the gearset RS3', via an additional incomplete gearset RS5, the electric machine being intended as a starter, generator and/or main engine. The gearset RS5 is incomplete in the sense that it lacks one ring gear. It consists only of a sun gear 13 that is connected to the electric machine 2, and the planetary gears 14, which are arranged co-axially to the planetary gears PL3 of the gearset RS3' and are connected to it, via a sleeve 15. The planetary gears PL3 and 14 thus form pairs, respectively, which rotate synchronously, but which can be of different sizes, or as the case may be, have different numbers of cogs. The output shaft 2, which is configured as a carrier shaft ST3, is divided in the area of the gearset RS3' and features a shaft journal 2a, which is rotatably accommodated in the sleeve 15 and a pivot bearing 2b, which rotatably accommodates the sleeve 15. The outer pivot bearing 2b, the middle sleeve 15, and the inner shaft journal 2a are, therefore, co-axially deposed, one inside the other. The sun gear 13 is affixed to a hollow shaft 16, which allows the output shaft 2 to pass through to the outside (to the wheels of the motor vehicle (not depicted). The rotating section of the electric machine 12 is thereby connected, via the sun gear 13, the planetary gear pairs PL3/14 to the fifth shaft; common output takes place, via the "divided" carrier shaft 2a, 2b, 2.

The hybrid-ready transmission 11 described above can perform the following functions, among others: the starter function for starting the combustion motor can be performed without an additional shifting element; a transmission ratio of i=1 is thereby produced between the electric machine and the combustion engine. The hybrid-ready transmission 11 can also function as a generator when the combustion engine is operating and drive the motor vehicle; whereby a battery of the vehicle (not shown), can be charged, via the generator. With respect to the transmission 11, it is advantageous that the shaft 5 is not in any gear when the speed of rotation of the shaft 5, with the exception of gear 4, is the same or greater than the transmission input speed of rotation. In addition, the electric machine can assume the function of electrically starting the vehicle. In order to do so, the brakes A, B (see FIG. 1) will be set so that the shaft 6 and also the ring gear HO3 are stationary—the gearset RS3' then acts as a stationary gear, whereby the planetary pair PL3/14 is driven by the sun gear 13 of the electric machine and its output acts, via the carrier shafts ST3, 2b, 2, on the wheels of the vehicle. The ratio between the electric machine and the transmission output is equal to the ratio of the first gear, i.e., i=4.7. Finally, the hybrid-ready transmission 11 can exercise the function of recuperation (without the thrust of the combustion motor). In this case as well, no additional shifting element is required relative to the transmission 10 according to FIG. 1. The recuperation operation can take place with the switching AB and DE, i.e., the fixed brakes A, B, as well as with the engaged clutches D and E, i.e., in the gears 1, 2, 4, 6, and 8. The ratio between the fifth shaft 5 is i=4.7 with the switching AB; with the switching DE, the ratio is i=1. Finally, with the presented hybrid-ready transmission 11, a booster function is possible, i.e., a supporting function, after an electric start—as described above—the already running combustion engine can be connected, where the performance of the combustion motor and the electric motor accumulate and are available to the output shaft 2 to drive the vehicle. The electric machine can, therefore, boost the performance of the combustion engine.

Figure 3:
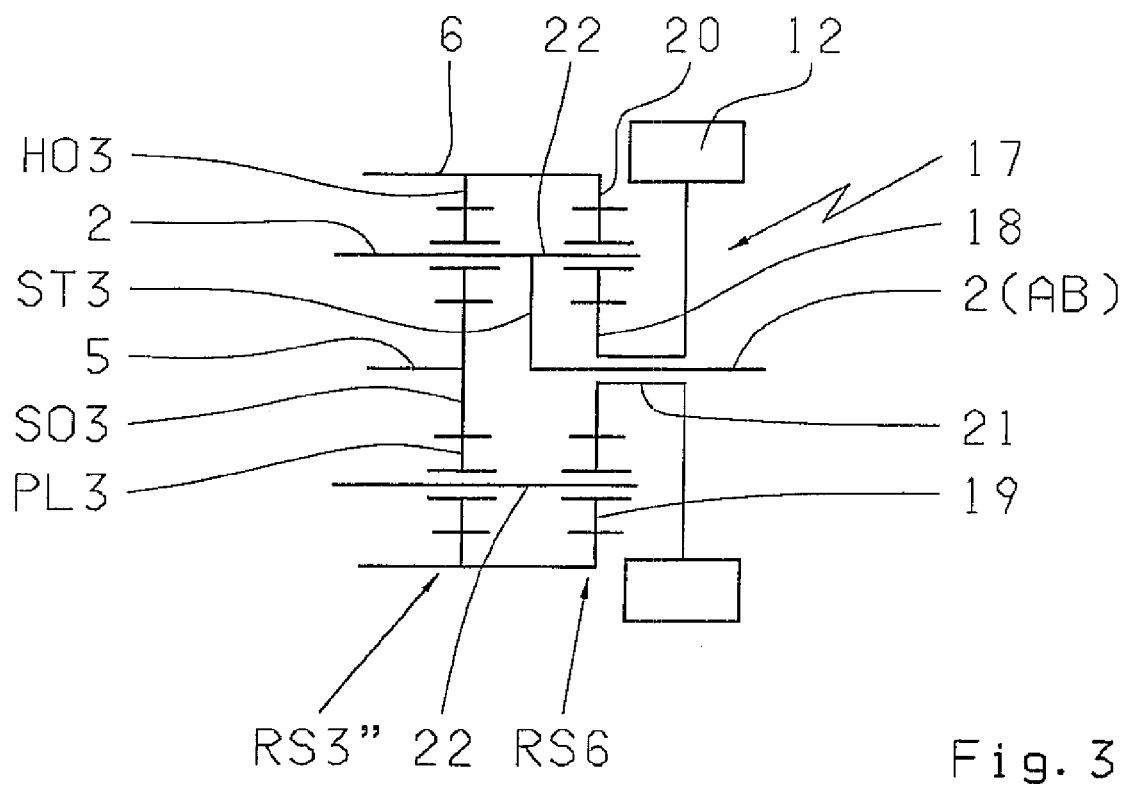
FIG. 3 is a second embodiment of the invention for connecting the electric machine by way of the drive connection.

FIG. 3 shows a second embodiment of the invention, i.e., a hybrid-ready transmission 17, in which—similar to the example of embodiment according to FIG. 2—only the output-side section, i.e., the gearset RS3 is depicted with its shafts 2, 5, 6. The gearset RS3, which is slightly modified, is designated with RS3" in FIG. 3 and features the sun gear SO3, the planetary gears PL3, and the ring gear HO3. The gearset RS3" is associated, in parallel, to an additional gearset RS6, which features a sun gear 18, a planetary gears 19 and a ring gear 20, which is connected to the ring gear HO3. The planetary gearset RS6 is driven by the electric machine 12, via a hollow shaft 21, and the sun gear 18. The planetary gears PL3, 19 are depicted as identical and arranged on a common planet shaft 22, via the second shaft 2, which is part of the carrier shaft ST3. The two gearsets RS3" and RS6 are thus symmetrically configured and connected to each other via a common ring gear 20/HO3. With this variation as well, torque of the electric machine 12 can be directed via the sun gear 18 into the transmission. The same functions, as described above in association with FIG. 2, can be performed.

REFERENCE NUMERALS

1 first shaft (input shaft)
2 second shaft (output shaft)
2a shaft journal
2b pivot bearing
3 third shaft
4 fourth shaft
5 fifth shaft
6 sixth shaft
7 seventh shaft
8 eighth shaft
10 multi-speed transmission
11 hybrid-ready transmission
12 electric machine
13 sun gear
14 planetary gear
15 sleeve
16 ring gear
17 hybrid-ready transmission
18 sun gear
19 planetary gear
20 ring gear
21 hollow shaft
22 planet shaft
AN input shaft
AB output shaft
RS1 first planetary gearset
RS2 second planetary gearset
RS3 third planetary gearset
RS3' modified third gearset
RS3" modified third gearset
RS4 fourth planetary gearset
RS5 fifth (incomplete) gearset
RS6 sixth gearset
SO3 sun gear of the $3^{rd}$ gearset
PL3 planet gear of the $3^{rd}$ gearset
HO3 ring gear of the $3^{rd}$ gearset
ST3 carrier of the $3^{rd}$ gearset A, B brakes
C, D, E clutches

The invention claimed is:

1. A multi-speed automatic planetary transmission for a motor vehicle comprising:
    an input shaft (AN);
    an output shaft (AB);
    first, second, third and fourth planetary gearsets (RS1, RS2, RS3, RS4), with each of the first planetary gearset (RS1), the second planetary gearset (RS2), the third planetary gearset (RS3) and the fourth planetary gearset (RS4) having a sun gear, a carrier and a ring gear;
    at least third, fourth, fifth, sixth, seven and eighth rotatable shafts (3, 4, 5, 6, 7, 8), and first, second, third, fourth and fifth shifting elements (A, B, C, D, E), whose selective engagement creates different gear ratios between the input shaft (AN) and the output shaft (AB) so that eight forward gears and at least one reverse gear can be implemented;
    an electric machine (12) being coupled, via a drive connection, to the fifth shaft (5), and the electric machine being at least one of generator and a drive engine;
    the first planetary gearset (RS1), the second planetary gearset (RS2), the third planetary gearset (RS3) and the fourth planetary gearset (RS4) are co-axially arranged in an axial direction in a sequential order of:
        the first planetary gearset (RS1), the fourth planetary gearset (RS4), the second planetary gearset (RS2) and the third planetary gearset (RS3); and the ring gear (HO3) of the third planetary gearset (RS3) is connected to the sixth shaft (6), planetary gears (PL3), and the carrier (ST3, 2) of the third planetary gearset (RS3) are connected to the output shaft (AB), wherein the drive connection comprise an additional sun gear (13, 18) connected to the electric machine (12), as well as additional planetary gears (14, 19) that engage with the additional sun gear (13, 18), to connect the gears to the third planetary gearset (RS3', RS3").

2. The multi-speed transmission according to claim 1, wherein the additional planetary gears (14) are connected in a rotationally fixed manner, via sleeves (15), to the planetary gears (PL3) of the third gearset (RS3').

3. The multi-speed transmission according to claim 2, wherein the carrier shaft (ST3) of the third planetary gearset (RS3) is split and has both a shaft journal (2a) and a pivot bearing (2b), and the shaft journal (2a) is rotatably arranged within the sleeve (15), and the sleeve (15) is rotatably arranged within the pivot bearing (2b).

4. The multi-speed transmission according to claim 1, wherein the planetary gears (PL3) of the third planetary gearset (RS3") and the additional planetary gears (19) are rotatably arranged on a common planet shaft (22) which is connected to the output shaft (2).

5. The multi-speed transmission according to claim 4, wherein the additional planetary gears (19) engage with an additional ring gear (20) which is connected to the ring gear (HO3) of the third planetary gearset (RS3).

6. The multi-speed transmission according to claim 4, wherein the planetary gears (PL3) of the third planetary gearset (RS3") and the additional planetary gears (19) have an equal number of cogs.

7. The multi-speed transmission according to claim 1, wherein the carrier (ST3) is arranged between the third planetary gearset (RS3', RS3") and the additional sun gear (13, 18) as well as the additional planetary gears (14, 19).

8. The multi-speed transmission according to claim 1, wherein the additional sun gear (13, 18) is arranged on a hollow shaft (16, 21).

9. The multi-speed transmission according to claim 8, wherein the output shaft (2, AB) passes through the hollow shaft (16, 21).

10. A multi-speed automatic planetary transmission for a motor vehicle, comprising:
    an input shaft (AN);
    an output shaft (AB);
    first, second, third and fourth planetary gearsets (RS1, RS2, RS3, RS4), the first planetary gearset (RS1), the second planetary gearset (RS2), the third planetary gearset (RS3) and the fourth planetary gearset (RS4) are co-axially arranged in an axial direction in a sequential order of the first planetary gearset (RS1), the fourth planetary gearset (RS4), the second planetary gearset (RS2) and the third planetary gearset (RS3);
    at least third, fourth, fifth, sixth, seven and eighth rotatable shafts (3, 4, 5, 6, 7, 8), and only first, second, third, fourth and fifth shifting elements (A, B, C, D, E), whose selective engagement creates different gear ratios between the input shaft (AN) and the output shaft (AB) so that eight forward gears and at least one reverse gear can be implemented;
    the third planetary gearset (RS3) comprising an additional first planetary gearset unit (RS3') and an additional second planetary gearset unit (RS5);
    the additional first planetary gearset unit (RS3) has a ring gear (HO3), one or more planetary gears (PL3) and a carrier (ST3, 2), the ring gear (HO3) of the additional first planetary gearset unit (RS3') is connected to the sixth shaft (6) and engages the one or more planetary gears (PL3) of the additional first planetary gearset unit (RS3'), and the one or more planetary gears (PL3) of the additional first planetary gearset unit (RS3') communicate with the fifth shaft (5); and
    the additional second planetary gearset unit (RS5) has a sun gear (13) and one or more planetary gears (14), the sun gear (13) of the additional second planetary gearset unit (RS5) engages the one or more planetary gears (14) of the additional second planetary gearset unit (RS5) and is connected, via a hollow shaft (16), to at least one of a generator and a drive engine (12), the one or more planetary gears (14) of the additional second planetary gearset unit (RS5) is connected to the one or more planetary gears (PL3) of the additional first planetary gearset unit (RS3'), such that the at least one of the generator and the drive engine (12) communicates with the fifth shaft (5).

* * * * *